US009524047B2

(12) United States Patent
Smoot

(10) Patent No.: US 9,524,047 B2
(45) Date of Patent: Dec. 20, 2016

(54) MULTI-TOUCH DETECTION SYSTEM USING A TOUCH PANE AND LIGHT RECEIVER

(75) Inventor: Lanny Smoot, Thousand Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1955 days.

(21) Appl. No.: 12/322,038

(22) Filed: Jan. 27, 2009

(65) Prior Publication Data

US 2010/0188340 A1 Jul. 29, 2010

(51) Int. Cl.
G06F 3/041 (2006.01)
G06F 3/01 (2006.01)
G06F 3/042 (2006.01)
G06F 3/0488 (2013.01)

(52) U.S. Cl.
CPC ............. *G06F 3/0412* (2013.01); *G06F 3/011* (2013.01); *G06F 3/042* (2013.01); *G06F 3/04883* (2013.01); *G06F 2203/04808* (2013.01)

(58) Field of Classification Search
USPC ........................................................ 345/173
See application file for complete search history.

(56) References Cited

U.S. PATENT DOCUMENTS

| | | | | |
|---|---|---|---|---|
| 5,940,139 | A * | 8/1999 | Smoot | ............................ 348/584 |
| 6,353,428 | B1 * | 3/2002 | Maggioni | ............. G06F 3/0425 |
| | | | | 345/157 |
| 7,168,813 | B2 | 1/2007 | Wong | |
| 7,348,963 | B2 | 3/2008 | Bell | |
| 2003/0122764 | A1 * | 7/2003 | Lee et al. | ......................... 345/94 |
| 2005/0162381 | A1 | 7/2005 | Bell | |
| 2006/0289760 | A1 | 12/2006 | Bathiche | |
| 2007/0176848 | A1 * | 8/2007 | Ferren et al. | ...................... 345/6 |
| 2007/0200970 | A1 | 8/2007 | Keam | |
| 2008/0011944 | A1 * | 1/2008 | Chua et al. | ............... 250/227.24 |
| 2008/0025548 | A1 * | 1/2008 | Nishimura et al. | ........... 381/396 |
| 2008/0029691 | A1 * | 2/2008 | Han | .............................. 250/224 |
| 2008/0122792 | A1 | 5/2008 | Izadi | |
| 2008/0179507 | A2 | 7/2008 | Han | |
| 2009/0128508 | A1 * | 5/2009 | Sohn et al. | .................... 345/173 |

OTHER PUBLICATIONS

Izadi, et al., "ThinSight: Integrated Optical Multi-touch Sensing through Thin Form-factor Displays", Association for Computing Machinery, Inc. (2007).
Omojola, et al., "An installation of interactive furniture", IBM Systems Journal, vol. 39, Nos. 3 & 4, pp. 861-879 (2000).

* cited by examiner

*Primary Examiner* — William Boddie
*Assistant Examiner* — Andrew Schnirel
(74) *Attorney, Agent, or Firm* — Farjami & Farjami LLP

(57) ABSTRACT

Disclosed are touch detection systems and methods. In one embodiment, a display panel enabling touch detection comprises a touch pane configured to allow a light including a detection light, a back inner surface, and a display generation module located between the touch pane and the back inner surface. The display generation module is configured to produce a visual display at the touch pane. The display generation module is further configured to pass the detection light received from the touch pane. The display panel also comprises a detection light receiver situated at the back inner surface configured to detect the detection light received through the display generation module for enabling a detection of touches to the touch pane of the display panel.

28 Claims, 4 Drawing Sheets

MULTI-TOUCH DETECTION SYSTEM USING A TOUCH PANE AND LIGHT RECEIVER

BACKGROUND OF THE INVENTION

1. Field of the Invention

The present invention generally relates to displays and, more particularly, the present invention relates to interactive display surfaces.

2. Background Art

Interactive computing devices, such as personal computers, mobile telephones, and personal digital assistants (PDAs), for example, play an increasingly important role in modern life. More and more, users of these devices rely on them as resources for effective time management, efficient communication, enhanced productivity, and even for entertainment. As interaction with computing devices has become an ever more frequent and important aspect of performing daily activities, the user friendliness of the input/output (I/O) interfaces enabling those interactions may prove to be a determinative factor in their practical utility.

For example, where computing devices were once typically stationary desktop or workstation based units, for which a standard QWERTY type keyboard and cathode ray tube (CRT) monitor provided adequate I/O support, today's highly mobile multi-tasking user requires a more consolidated and efficient interface. Several alternative interface options are presently available, including those enabling voice activated input, but few are more popular than the intuitive and visually appealing touch screen display. Perhaps no cognitive behavior is more instinctive than visual recognition of a desired object combined with selection of that object by means of reaching out and touching it. A touch screen display caters to this intuitive impulse by tying both output, i.e., display, and input, i.e., selection, to a common, visually compelling, symbol—typically through use of an icon or visual thumbnail.

Another aspect of touch screen displays that make them appealing and easy to interact with is their scalability. This may be apparent from the use of relatively large, wall mounted touch screen displays for delivery of educational and entertainment content at a museum, for example. In that setting, a visitor may approach the display, on which a variety of static or dynamic images may be shown, and select an image by touching its representation. As a result of that interaction, the content delivery system controlled by the touch screen may present information and/or entertainment content associated with the selected image, as well as cue the visitor regarding additional opportunities for interaction with the display. One significant advantage of presenting interactive content by means of a touch screen I/O interface is that in addition to being pleasing to use for adult visitors, its use is intuitively obvious to children, so that they are encouraged to engage useful and informative content without the obstacle of first learning a formalistic interaction protocol, such as may be required by keyboard interfaces, for example.

Despite their notable advantages as I/O interfaces, most touch screen displays in use today suffer the significant disadvantage of being single touch systems. Interaction with the surface of the display, through a user touch, is typically detected and interpreted according to changes in any of a variety of electromagnetic properties of the surface, such as changes in capacitance or inductance at or near the touch point, for example. One of the consequences of this approach to detecting and interpreting touch is that only one touch may be processed at a time. Attempts to apply multiple touches to such a display concurrently usually give rise to a number of undesirable results.

For example, multiple touches applied more or less concurrently to a single touch display may result in priority being given to one of the touches over all others, for example due to slight differences in the timing of the multiple touches, or the relative effect on the electromagnetic display properties produced by the independent touches. Under those circumstances, the touch screen controlled system may respond appropriately to one of a number of touches, but not to others applied at about the same time, creating user confusion. Alternatively, but no less undesirably, a single touch display may attempt to respond appropriately to multiple concurrent touches by interpreting them as a single touch at some geometric or other metric average corresponding to the multiple touches. Such a response can be even more frustrating and confusing for the user because the touch "detected" by the touch screen and interpreted as system input may not correspond accurately to any individual selection entered by the user, so that the system's response may seem random and arbitrary. These and other problems associated with use of a touch screen I/O interface may be exacerbated when the touch screen is implemented as an interactive floor. Here, the foot positions of numerous simultaneous users and/or other objects on the touch surface must be detected. In addition, a floor may present the need for an interactive surface area that is large (say greater than 10 feet on a side) and that is not conveniently provided by a single display. Moreover, the display must support the physical weight of multiple simultaneous users.

One approach to overcoming the described disadvantages associated with single touch, touch screen displays is shown by FIG. 1. FIG. 1 shows a diagram of a system for detecting touches to a display surface utilizing an overhead camera to record interactions between the feet of multiple users and a touch screen surface in the form of an interactive floor. System 100, in FIG. 1, includes overhead camera 104 mounted on ceiling 102, and users 110 and 120 interacting with touch screen display surface 106.

One advantage of the system shown in FIG. 1 for detecting concurrent multiple touches of display surface 106 is that it does not rely on monitoring changes to the electromagnetic properties of display surface 106 due to contact with a user. As a result, user 110 and user 120, as well as other users, may concurrently contact display surface 106, and even move about on display surface 106, without introducing intractable complexity to the detection scheme. However, the approach shown by FIG. 1 suffers from at least one significant disadvantage flowing from interposition of users 110 and 120 between display surface 106, at which touching is occurring, and overhead camera 104, through which touching is being detected.

As may be seen from FIG. 1, a consequence of the approach of system 100 is that the physical presence of users 110 and 120 between overhead camera 104 and display surface 106 can obscure the exact location of touch points 112, 114, 122, and 124. For example, shadow 116, produced by user 110, may prevent overhead camera 104 from capturing either or both of touch points 112 and 114.

Similar difficulties may obscure the precise interaction of user 120 with display surface 106 at touch points 122 and 124. Furthermore, under different circumstances, shadow 126, produced by user 120, may not obscure touch points 122 and 124 produced by user 120, but may obscure the precise location of touch points 112 and/or 114 produced by user 110. Moreover, as the number of users utilizing display surface 106 grows more numerous, and as the user interactions become more frequent and/or dynamic, the described touch detection failures are likely to proliferate.

Although it may be possible in principle to reduce the incidence of detection failure by several means, such as providing a plurality of cameras corresponding to camera 104, and/or increasing the overhead distance of camera 104, those solutions may prove to be very expensive or otherwise impracticable, depending on available resources and the type of venue in which the display surface is to be implemented. For example, in an environment in which low ceilings prevent elevation of overhead camera 104, and aesthetic considerations weigh against use of many overhead cameras, implementation of a system like system 100 may be out of the question.

Accordingly, there is a need to overcome the drawbacks and deficiencies in the art by providing a solution offering reliable and accurate touch detection of an interactive display surface.

SUMMARY OF THE INVENTION

There are provided touch detection systems and methods for use by a display panel, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
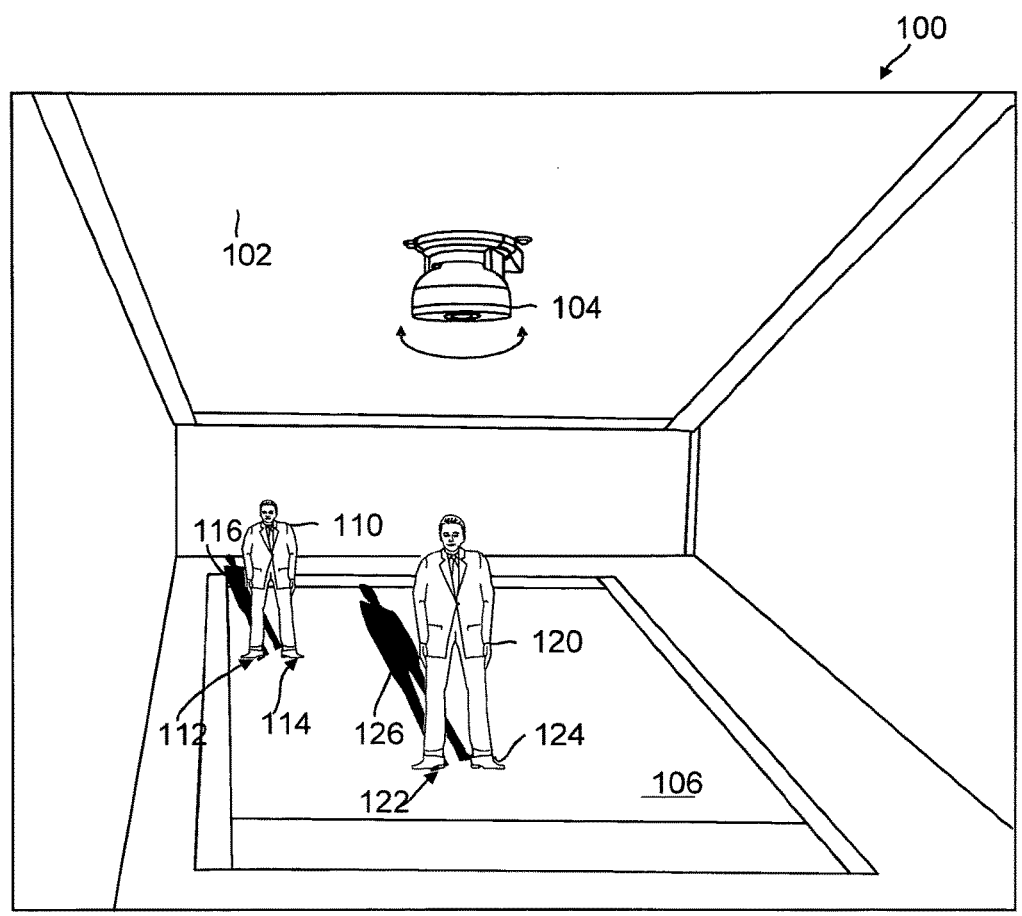
FIG. 1 shows a diagram of a system for detecting touches to a display surface.

The present application is directed to a touch detection system and method. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 2:
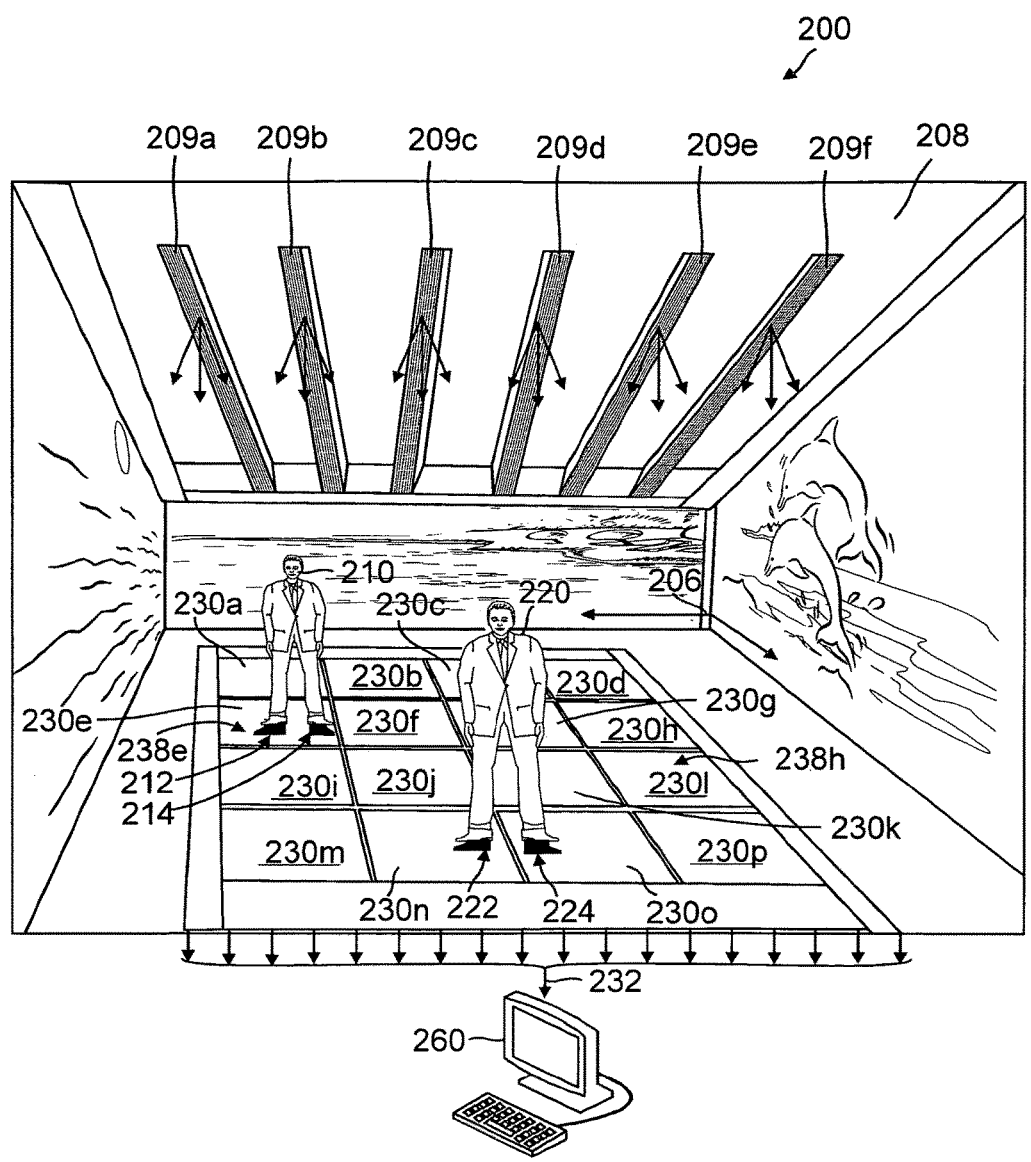
FIG. 2 shows a diagram of a system for detecting touches to a display surface, according to one embodiment of the present invention.

The present inventor has recognized the drawbacks and deficiencies of existing solutions to providing touch detection, and has succeeded in overcoming those disadvantages. FIG. 2 shows a diagram of a system for providing touch detection, according to one embodiment of the present invention. In the embodiment of FIG. 2, system 200 comprises diffuse, broad area, illumination source 208 including light strips 209a through 209f, display surface 206 including display panels 230a through 230p, and processor 260 receiving detection light data 232 from display panels 230a through 230p. Also shown in FIG. 2 are users 210 and 220 producing respective touch points 212 and 214, and 222 and 224, on display surface 206.

According to the embodiment of FIG. 2, system 200 enables sensing of touching, including, for example multiple concurrent touches, of display surface 206 according to detection light data 232 provided by display panels 230a through 230p. As shown by FIG. 2, the detection light may be provided by distributed illumination source 208. The use of a spaced-out, diffuse light source prevents having shadows of objects fall on the interactive surface unless those objects are substantially touching the surface, and therefore blocking substantially all light to the surface in the area of contact. In the embodiment of system 200, the touch sensing is performed through processing or interpretation of detection light data 232 by processor 260. Although in the embodiment of FIG. 2, interpretation of detection light data 232 is represented as being performed by a computer, more generally, interpretation of detection light data 232 may be performed by any suitable data analysis module. For example processing of detection light data 232 may be performed by a single central processor corresponding to processor 260, or by multiple individual processors included in each of display panels 230a through 230p.

Display surface 206 may be readily scaled by addition or removal of display panels 230a through 230p, each of which may comprise a self contained display surface. Thus, display surface 206 may comprise one or more of display panels 230a through 230p, each having a touch pane, as shown by respective representative touch panes 238e and 238h. When, as in FIG. 2, a plurality of display panels 230a through 230p is utilized to form display surface 206, that plurality of display panels may be configured to function cooperatively to produce aggregate visual displays comprised of several, or all, of the individual images at each of the touch panes.

The structure and operation of display panels 230a through 230p will be more fully described later by reference to FIG. 3. For the time being, it is sufficient to regard each of display panels 230a through 230p as comprising a display generation module, such as a liquid crystal display (LCD) system, for example, with a touch pane, i.e., one corresponding to 238e or 238h, which is substantially transparent to visible and invisible light. Although the embodiment of FIG. 2 shows display surface 206 situated as a substantially horizontal surface on which users 210 and 220 are standing, i.e. as an interactive floor, in other embodiments, display surface 206 may be implemented as an interactive ceiling or be arranged vertically to form a large interactive screen or interactive wall. Where, as in FIG. 2, display surface 206 is implemented as an interactive floor or other stress bearing interactive surface, the front outer surfaces of the display panels, shown as touch panes 238e and 238h, may be structural surfaces configured to be load bearing as well as being substantially transparent to visible and invisible light.

Thus, in the embodiment shown in FIG. 2, display surface 206 corresponds to an interactive display surface on which is produced a display visible to users 210 and 220. Users 210 and 220 may interact with the image shown on display surface 206 by making contact with display surface 206 at touch points, as shown by touch points 212 and 214 produced by user 210 and touch points 222 and 224 produced by user 220. Detection of touch points 212, 214, 222, and 224, which may result from the substantially concurrent multiple touching of display surface 206 by users 210 and 220, may be performed by sensing changes in the pattern of detection light present at the touch panes of display panels 230a through 230p.

Detection light may be provided by illumination source 208, which can be configured to flood the touch panes of display panels 230a through 230p with a substantially uniform, and in the absence of touch points 212, 214, 222, and 224, substantially shadow-free distribution of light including a detection light. As a specific example, and pretending for the moment that users 210 and 220 are not present on display surface 206: where a display surface is arranged as an interactive floor, as in FIG. 2, corresponding illumination source 208 may comprise a plurality of light strips 209a through 209f, recessed into a ceiling facing display surface 206. In one embodiment, for example, a detection light may comprise near-infrared (NIR) light, that is, light that is redder than red light and outside the visible spectrum. In that embodiment, light strips 209a through 209f may correspond to an array of conventional rope lights recessed into illumination source 208, which may be a low overhead ceiling, for example.

Conventional incandescent rope lights emit both visible light and abundant NIR light. As a result, an array of rope lights arranged as light strips 209a through 209f, which are distributed over the entire interactive floor and extend substantially beyond the vertical projection of the floor edges, could be expected to flood display surface 206 with a substantially uniform and shadow-free light including visible light and detection NIR light. In other embodiments, other illumination schemes might be implemented, such as light banks arranged around the border of display surface 206 so as to project light onto the touch panes of display panels 230a through 230p from various distances and/or angles, or upward facing light sources can be diffusely reflected from a ceiling over the floor. In embodiments in which display surface 206 is implemented other than as a floor, illumination source 208 can be correspondingly adapted. For example, where display surface 206 is arranged vertically as a multi-touch wall, illumination source 208 might comprise a facing light emitting wall or an array of lights arranged at a perimeter of such a wall.

Returning to the example shown by FIG. 2, illumination source 208 may provide a combination of visible light and NIR detection light from an overhead position. In some embodiments, it may be deemed advantageous to eliminate light components other than detection light from the light emitted by illumination source 208. For example, where the detection light is NIR light, and that light is provided by rope light strips 209a through 209f emitting both visible light and NIR detection light, the emitted light might be pre-filtered by an NIR filter (not shown in FIG. 2) overlying rope light strips 209a through 209f. Such an NIR filter could be configured to pass NIR light but block visible light so that illumination source 208 would provide a substantially uniform and shadow free detection light at the touch panes of display panels 230a through 230p. Because, in that embodiment, visible light produced by illumination source 208 would be blocked, the illumination produced by illumination source 208 could provide detection light of adequate intensity at display surface 206 yet not interfere with the visual display concurrently produced at display surface 206 by display generation modules, such as LCD systems, included in display panels 230a through 230p.

Because illumination source 208 can be configured to provide an adequately intense detection light that is substantially uniform across display surface 206, changes in the intensity of the detection light at the touch panes of display panels 230a through 230p may be interpreted as corresponding to inputs provided by users 210 and 220. Moreover, because the detection light is provided so as to produce a substantially shadow free light distribution at the touch panes of display panels 230a through 230p, those changes in detection light intensity at the surface can be precisely correlated to touch points 212, 214, 222, and 224, rather than being due to detection light obstruction by the mere presence of users 210 and 220. Thus, the interaction of users 210 and 220 with multi-surface 206 produces changes in detection light intensity at touch points 212, 214, 222, and 224, which may correspond with a high degree of precision to the actual touches applied to display surface 206 by users 210 and 220 at respective touch points 212, 214, 222, and 224.

As will be explained in greater detail with reference to FIG. 3, display panels 230a through 230p may be constructed so as to have their respective display generation modules transparent or translucent to the detection light provided at their respective touch panes. Consequently, in some embodiments, a detection light receiver situated at the back inner surface of each display panel may be utilized to sense areas of relative detection light brightness and/or areas of relative detection light darkness at the touch pane of the display panel. The collective sensing of display panels 230a through 230p may be provided to processor 260 as detection light data 232, where that detection light data may be interpreted to accurately detect the multiple concurrent touches of display surface 206 by users 210 and 220.

Figure 3:
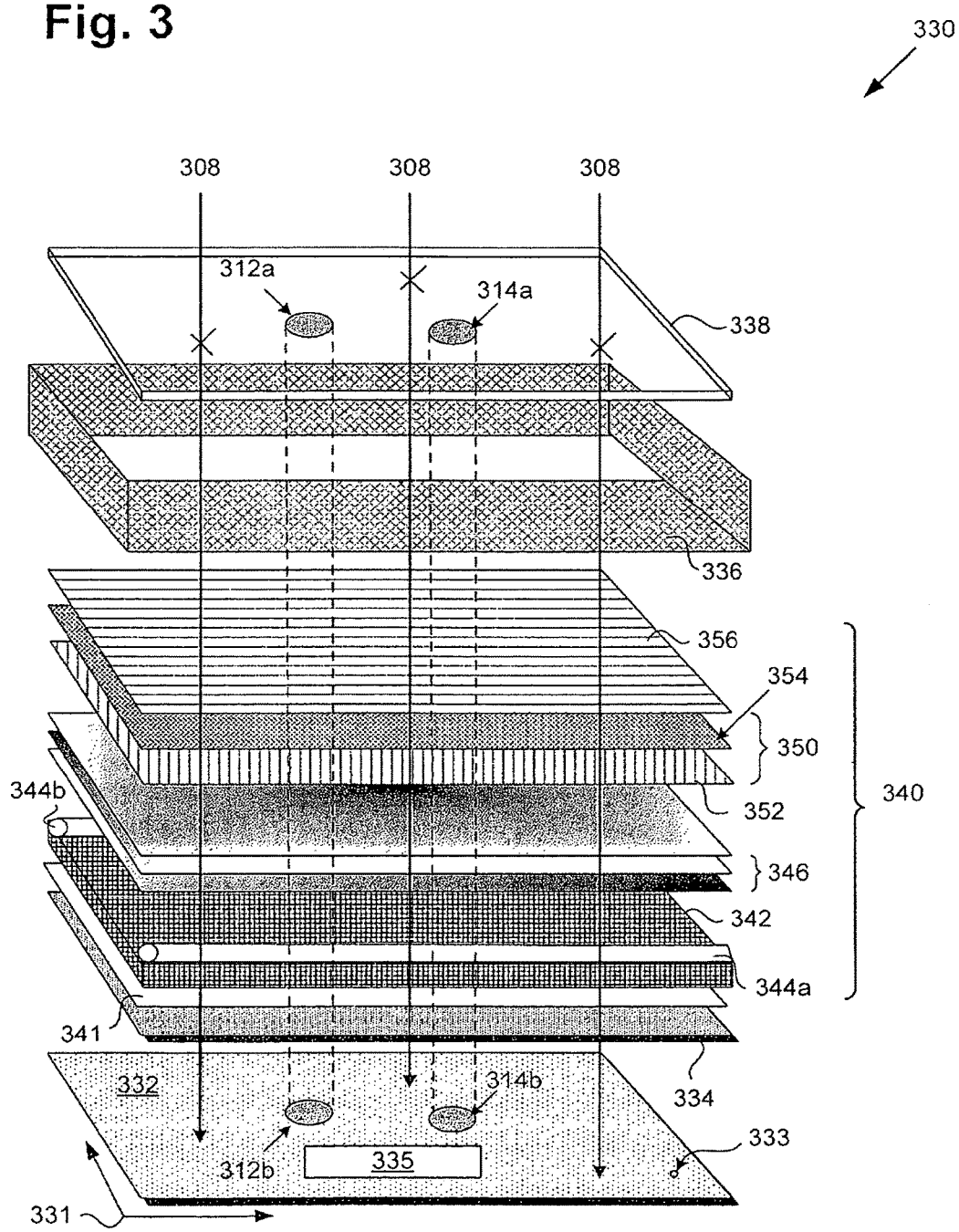
FIG. 3 shows a more detailed embodiment of a display panel for use in a system for detecting touches to a display surface, according to one embodiment of the present invention.

Turning now to FIG. 3, FIG. 3 shows a more detailed embodiment of a display panel for use in a system for providing touch detection, according to one embodiment of the present invention. As a preliminary matter, it is noted that the embodiment of FIG. 3 is provided for purposes of illustration only and is not to be construed as limiting the scope of the present inventive concepts. For example, although FIG. 3 presents a specific selection of components and their arrangement for use in an LCD system implemented as a display generation module, other arrangements using more, or fewer, components may be used. Moreover, in some embodiments a display generation module may comprise technology other than an LCD system. In general, any display system that is, or may be rendered sufficiently transmissive of detection light, can be utilized to provide touch detection according to the principles disclosed in the present application.

According to the specific embodiment of FIG. 3, display panel 330 comprises touch pane 338, display generation module 340, detection light filter 334, and detection light receiver 332 situated at back inner surface 331. Also shown in FIG. 3 is frame 336, which may be used to enclose the internal components of display panel 330 and to provide additional structural support to the display panel. In addition, FIG. 3 shows touch points 312a and 314a, detection points 312b and 314b produced by touch points 312a and 314a, and detection light rays 308 being transmitted through touch pane 338, display generation module 340, and detection light filter 334, to detection light receiver 332.

Display panel 330, in FIG. 3 corresponds in general to any of display panels 230a through 230p, in FIG. 2. More specifically, touch points 312a and 314a on touch pane 338, correspond respectively to touch points 212 and 214 on touch pane 238e in FIG. 2. As discussed in relation to FIG. 2, touch pane 338 of display panel 330 is substantially transparent to visible light as well as being configured to allow passage of detection light rays 308 through it. Display generation module 340, which is shown to be effectively transparent, or at least translucent, with respect to detection light rays 308, is shown in FIG. 3 to be located between touch pane 338 and back inner surface 331 of display panel 330 and is configured to produce a visual display at touch pane 338.

The embodiment of FIG. 3 continues to represent the example arrangement discussed previously during the description of FIG. 2 in which detection light rays 308 comprise NIR detection light and display generation module 340 comprises an LCD system. As shown in the embodiment of FIG. 3, display generation module 340 may comprise LCD 350 including liquid crystal layer 354 between upper polarizer 356 and lower polarizer 352, display light diffusion tri-layer 346, backlight total internal reflection/diffuser (TIR/diffuser) 342 side-illuminated by display light sources 344a and 344b, and internal reflection layer 341, as known in the art. It is noted that the heavy arrows shown on upper polarizer 356 and lower polarizer 352 are provided as a visual aid to emphasize that the respective directions of polarization of the two polarizers are substantially orthogonal to one another in the plane of LCD 350. Because LCD 350, light diffusion tri-layer 346, and TIR/diffuser 342 may be selected to be largely transmissive of NIR light, the use of an LCD system as display generation module 340 of display panel 330 enables transmission of detection light rays 308 from touch pane 338 to detection light receiver 332 when the detection light comprises NIR detection light.

With respect to the performance of internal reflection layer 341, that layer is typically selected such that backscattered light produced by display light sources 344a and 344b and TIR/diffuser 342 that would otherwise be wasted, is recycled and diffusely reflected up through LCD display 350 and touch pane 338. In some cases, internal reflection layer 341 is adequately transmissive of NIR light and can be utilized without modification when the detection light is NIR detection light. In other implementations, however, it may prove necessary or desirable to alter the arrangement shown in FIG. 3, in order to enhance passing of detection light to detection light receiver 332. This may be accomplished in several ways.

In one embodiment, for example, display generation module 340 can be configured to be transmissive of detection light through creation of openings, such as holes, through internal reflection layer 341, permitting the passage of detection light from touch pane 338 through display generation module 340 to detection light receiver 332. Alternatively, internal reflection layer 341 may be replaced by a cold mirror (not shown in FIG. 3), which is concurrently reflective of visible light and transmissive of NIR light. In yet another embodiment, internal reflection layer 341 may be removed entirely. In that latter embodiment, internal reflection of LCD display light can be achieved by applying a reflective layer, such as a bright white layer, for example, to hack inner surface 331 of display panel 330 (except at the positions of the individual photodetectors 333).

Detection light filter 334 is shown to be positioned between display generation module 340 and back inner surface 331 and is configured to pass detection light rays 308 passed through touch pane 338 and display generation module 340 to detection light receiver 332. In the present embodiment, for example, detection light filter 334 may comprise an NIR filter layer, permitting passage of NIR detection light but blocking visible light. As may be understood in the embodiment of FIG. 3 in which display generation module 340 comprises an LCD system, light produced by display light sources 344a and 344b, but incompletely directed toward LCD 350 by internal reflection layer 341 may be prevented from reaching detection light receiver 332 by the presence of detection light filter 334. Thus, detection light filter 334 is configured to reject light produced by display generation module 340.

Detection light receiver 332 is situated at back inner surface 331 and may take a variety of forms. For example, as shown in FIG. 3, detection light receiver 332 may comprise one or more printed circuit boards (PCBs) on which are mounted an array of photodetectors 333 sensitive to detection light rays 308. The described array may form a detector grid, for example, for an interactive floor where resolution only sufficient to detect a human foot is required, with individual photodetectors separated by approximately 1.0 inch to approximately 2.0 inches. The output of the photodetector array comprised by detection light receiver 332 may then be provided as detection light data to a computer, not shown in FIG. 3, but corresponding to detection light data 232 provided to processor 260, in FIG. 2.

Alternatively, detection light receiver 332 may comprise an array of photodetectors 333, for receiving detection light rays 308. As was the case for the described photodetector array, a fiber optic cable input array could form a grid with individual inputs separated by approximately 1.0 inch to approximately 2.0 inches, for example. As yet another alternative not shown in FIG. 3, detection light receiver 332 might comprise one or more cameras 335 sensitive to the detection light, spaced below filter 334 and facing upwards so as to view detection light 308 passing through touch pane 338). These cameras 335 should be sensitive to NIR light if implemented as part of the previously described exemplary embodiment discussed in conjunction with FIGS. 2 and 3.

In some embodiments, such as those in which detection light receiver 332 comprises an array of photodetectors or one or more detection light sensitive cameras, detection light receiver 332 may provide detection light data for interpretation by a touch detection processor. In other embodiments in which detection light receiver 332 functions as a conduit of detection light, such as where detection light receiver 332 comprises an array of fiber optic inputs, for example, display panel 330 may further comprise a data interface to generate detection light data from the detection light received by detection light receiver 332. Moreover, in some embodiments, display panel 330 may further comprise a processor corresponding to processor 260, in FIG. 2, to interpret the detection light data and detect touches to touch pane 338.

It is noted that there are numerous variations on the number and arrangement of the components shown in FIG. 3. In addition to the various embodiments previously described, in some embodiments, display light for display generation module 340 can be provided by an array of cold cathode fluorescent light (CCFL) tubes in place of TIR/diffusion layer 342 and display light sources 344a and 344b. In that embodiment, the spacing and arrangement of photodetectors 333 at detection light receiver 332 can be selected so as to enable photodetectors 333 to effectively peer up between the potential obstructions presented by the CCFL tubes. Furthermore, in some embodiments, detection light filter 334 may be omitted from display panel 330. For example, in some implementations detection light receiver 332 may be selectively responsive to detection light to such an extent that the light produced by display generation module 340 need not be rejected in order for touch detection to occur.

The possible variations to the embodiment of FIG. 3 may be even more profound. For example, although display panel 330, in FIG. 3, has been described as allowing detection light to pass from outside of display panel 330 through touch pane 338 and display generation module 340 to detection light receiver 332, in some embodiments, a detection light source may be internal to display panel 330. In one such embodiment, for example, touch pane 338 may be edge-lit with detection light from an illumination source contained by display panel 330. In that embodiment, the illumination could be configured such that the detection light is confined to touch pane 338 by total internal reflection. When a touch occurs at touch pane 338, index matching to touch pane 338 results in leakage of the detection light through the touch point, producing a detection light bright spot at the touch point.

In another embodiment, a detection light source situated between touch pane 338 and detection light receiver 332 may provide upward directed detection light that is preferentially reflected back toward detection light receiver 332 from locations at touch pane 338 at which touching is occurring. Thus, touch detection is enabled by reflected detection light being returned through touch pane 338, through display generation module 340, and on to detection light receiver 332. In some cases, that portion of the light from the LCD backlight that falls within the spectrum of the photodetectors 333 on detection layer 332 may provide this internal illumination detection light source.

Thus, in some embodiments, the detection light is detected as a result of passage through touch pane 338 from an illumination source outside of display panel 330, while in others detection light is detected as a result of reflection of light generated internal to display panel 330. Moreover, in some embodiments touching of touch pane 338 is sensed by the relative detection light darkness of the touch point, as in FIG. 3, while in other embodiments touching of touch pane 338 results in detection light brightness at the touch point.

A display panel such as display panel 330, in FIG. 3, may be further configured to provide substantially instantaneous feedback to a user applying touches to touch pane 338. For example, in one such embodiment, an ultra-violet (UV) fluorescent elastomeric layer (not shown in FIG. 3) may be situated so as to overlay and lightly contact the outer surface of touch pane 338. This layer will not optically couple (index match) to the surface, unless pressed against it by the pressure of a touch, and will spontaneously break optical coupling some time after pressure is removed. Touch pane 338 is then simultaneously edge lit with both detection light, and ultraviolet light (the ultraviolet light containing the spectrum of light that will cause the elastomeric material to fluoresce in the visible range). Both wavelengths of light will be captured by total internal reflection inside touch pane 338 until touch occurs. This approach may be particularly advantageous in implementations in which touching of touch pane 338 comprises writing or drawing on touch pane 338. When writing, for example, occurs on an embodiment of display panel 330 including a UV fluorescent layer on touch pane 338, compression of the elastomeric layer causes optical coupling between the elastomer and touch pane 338 and breaks total internal reflection at the touch points such that both infrared, and UV light couple into the fluorescent elastomer. The user can then see the visible glow at touch pane 338, rendering the written characters immediately discernable. Detection light, such as NIR detection light, received at detection light receiver 332 can be concurrently sensed and then interpreted to produce a lasting record of the writing at touch pane 338. Consequently, a user seeking to draw or write on display panel 330 may be provided with an immediate, but transient image corresponding to the writing, produced by UV fluorescence, and a more permanent image rendered as a result of NIR-based touch detection at touch pane 338. If the spacing of detectors at detection layer 332 is large, then the UV layer provides a high resolution, immediately visible, image while detection array 332 can be used, for instance, to detect the user's hand position during his/her high resolution input, for use in other application control functions.

FIG. 2 and FIG. 3 will now be further described with reference to FIG. 4, which presents a method for providing touch detection, according to one embodiment of the present invention. Certain details and features have been left out of flowchart 400 that are apparent to a person of ordinary skill in the art. For example, a step may consist of one or more substeps or may involve specialized equipment or materials, as known in the art. While steps 410 through 460 indicated in flowchart 400 are sufficient to describe one embodiment of the present method, other embodiments may utilize steps different from those shown in flowchart 400 or may include more or fewer steps.

Figure 4:
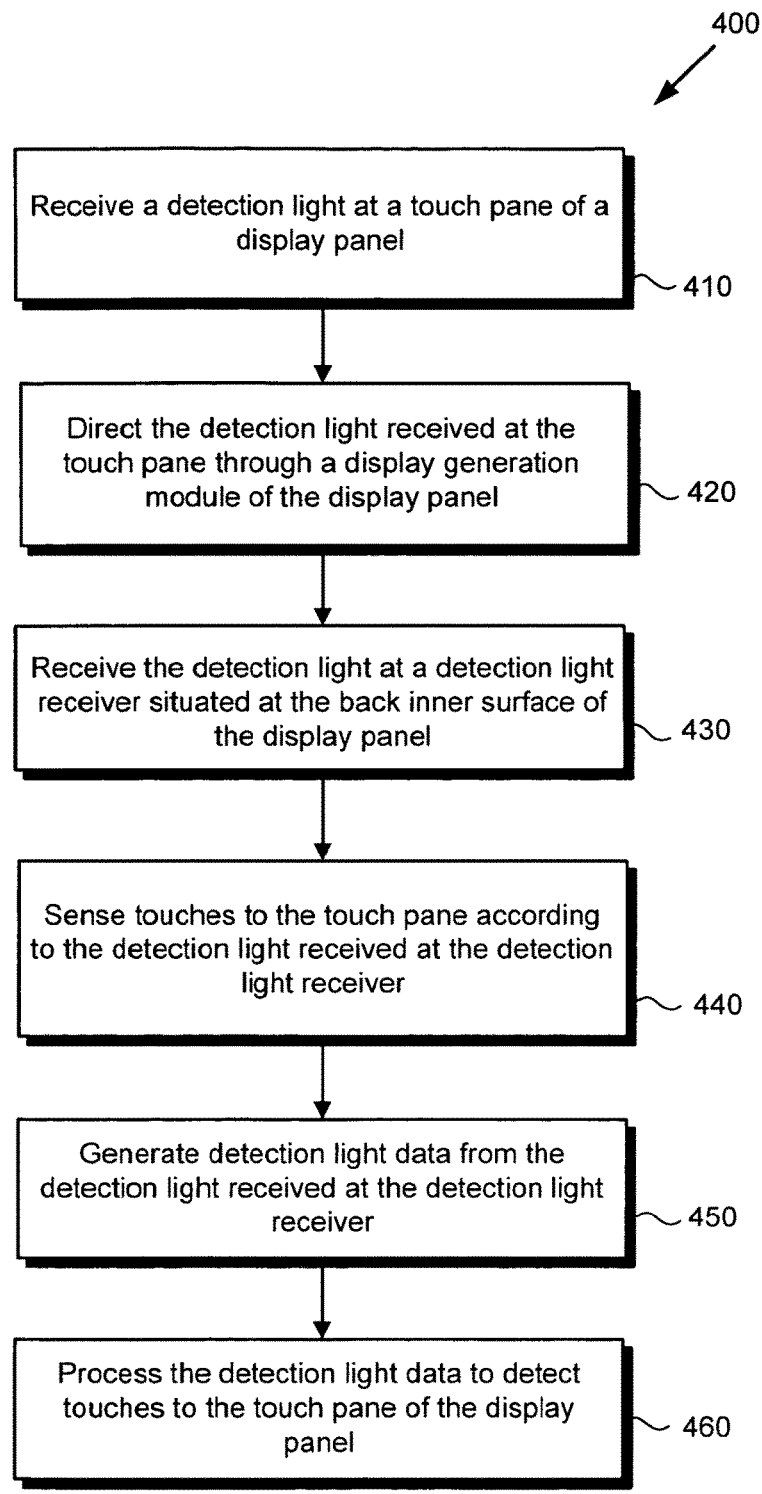
FIG. 4 is a flowchart presenting a method for detecting touches to a display panel, according to one embodiment of the present invention.

Beginning with step 410 in FIG. 4 and referring to FIGS. 2 and 3, step 410 of flowchart 400 comprises receiving, at touch pane 338, a detection light from an illumination source, such as illumination source 208, in FIG. 2. Step 410 may be seen to correspond to receiving detection light rays 308, in FIG. 3. As previously discussed, in one embodiment, the detection light comprises NIR light, so that receiving the NIR detection light may include concurrently receiving visible light and NIR detection light. In other embodiments, detection light may be emitted by a relatively pure detection light source, so that the received light may constitute substantially detection light and little or no visible and/or other light. In addition, as previously described, in still other embodiments the illumination source may be contained within display panel 330, so that receiving the detection light may correspond to receiving detection light coming from within display panel 330 at a back inner surface of touch pane 338.

Continuing with step 420 of flowchart 400 and turning to FIG. 3, step 420 of flowchart 400 comprises directing the detection light received at touch pane 338 through display generation module 340 of display panel 330. As previously described in conjunction with FIG. 3, in some embodiments, the detection light may be directed as a result of passage through touch pane 338 from an illumination source outside of display panel 330, while in others detection light is directed as a result of reflection internal to display panel 330, from objects on touch pane 338 to detection light receiver 332. Step 420 results in passage of the detection light, such as detection light rays 308, in FIG. 3, towards back inner surface 331 of display panel 330.

Moving now to step 430 of Flowchart 400, step 430 comprises receiving the detection light rays 308 at detection light receiver 332 situated at back inner surface 331 of the display panel 330. Receiving the detection light in step 430 occurs after directing of the detection light received from touch pane 338 through display generation module 340, in step 420. As described by reference to previous FIG. 3, receiving the detection light may be performed by various means, such as by an array of photodetectors 333 mounted on one or more PCBs, an array of photodetectors 333 arranged to receive detection light rays 308, which may comprise NIR detection light, for instance, or a plurality of cameras sensitive to detection light rays 308, for example.

Continuing with step 440 of flowchart 400, step 440 comprises sensing touches to touch pane 338 of display panel 330 according to the detection light received at detection light receiver 332. As discussed, in the specific embodiment of FIG. 3, passage of detection light rays 308 through touch pane 338, display generation module 340, and detection light filter 334, results in production of detection points 312b and 314b at detection light receiver 332, which reliably and accurately correspond to touch points 312a and 314a. Thus, the present method enables detection of touch points 312a and 314a to touch pane 338 of display panel 330.

The example method of flowchart 400 continues in step 450 by generating detection light data from the detection light received at detection light receiver 332 in previous step 440. As explained earlier in conjunction with FIG. 3, in some embodiments, detection light receiver 332 may perform step 450 and provide the detection light data. In other embodiments, however, display panel 330 may further comprise a data interface to generate detection light data from the detection light received by detection light receiver 332. For example, in embodiments in which detection light receiver 332 comprises an array of photodetectors 333, the photodetectors 333 may be scanned a row at a time and a column at a time, in a manner analogous to standard NTSC/RS170 scanning techniques, allowing instantaneous output of video data. That is to say, the column and row drive signals can be synchronized with a video standard to produce the detection light data in the form of video output. Alternatively, photodetectors 333 can be scanned in an arbitrary manner, for instance, scanning repeatedly in some areas of the array at high rates and more slowly in other areas of the array. This latter approach may be implemented to reflect differences in sensitivity, update rate, and frame rate, for example.

In step 460 of flowchart 400, the light detection data generated in step 450 is processed and interpreted to detect touches to the outer surface of touch pane 338 of display panel 330. As already described, in some instances, processing of detection light data may be performed for a plurality of display panels, such as display panel 330, by a central processor, such as processor 260, in FIG. 2. In other embodiments, however, each individual display panel 330 may include its own processor configured to perform or participate in performance of step 460.

Although not included in the method of flowchart 400, in some embodiments, a method for providing touch detection may further comprise filtering light passed through touch pane 338 and display generation module 340 of display panel 330. Filtering of the light passed through those recited components of display panel 330, which prior to filtering may include detection light and visible light or other light, may be performed by detection light filter 334, for example, located between display generation module 340 and back inner surface 331. Step 420 results in passage of detection light rays 308 towards back inner surface 331 of display panel 330 and rejection of display light produced by display generation module 340.

In some embodiments, moreover, a method for providing touch detection may further comprise utilizing display generation module 340 to produce a visual display at touch pane 338 of display panel 330, for example, by an LCD system providing a presentation to users 210 and 220 interacting with display surface 206, in FIG. 2. Furthermore, in embodiments in which the detection light illumination source is external to display panel 330, as in FIG. 2, for example, the present method may include pre-filtering the emitted light to pass substantially only detection light prior to flooding touch pane 338 of display panel 330. Pre-filtering of the emitted light may be performed, for example, so as not to flood touch pane 338 with visible light that might interfere with a visual display provided at that surface by display generation module 340.

Thus, the present application discloses a touch detection system and method enabling reliable, accurate, touch detection of concurrently applied touches to an interactive surface by multiple users. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A display panel for sensing an object touching the display panel using a detection light generated by a light source located above the object and separate from the display panel, the display panel comprising:
   a touch pane configured to allow the detection light generated by the light source located above the object and separate from the display panel to pass through the touch pane, wherein the detection light is substantially shadow-free when the object is present;
   a back inner surface;
   a display generation module located between the touch pane and the back inner surface, the display generation module configured to produce a visual display at the touch pane, the display generation module further configured to allow the detection light received from the touch pane to pass through the display generation module; and
   a detection light receiver situated at the back inner surface, the detection light receiver configured to detect the detection light received through the display generation module for enabling a detection of touches of the object to the touch pane of the display panel.

2. The display panel of claim 1, further comprising a detection light filter positioned between the display generation module and the back inner surface, the detection light filter configured to pass the detection light received from the touch pane and passed through the display generation module, the detection light filter further configured to reject a light produced by the display generation module.

3. The display panel of claim 2, further comprising a processor configured to interpret a detection light data generated from the detection light received through the detection light filter, to detect touches to the touch pane of the display panel.

4. The display panel of claim 1, further comprising an-illumination source configured to provide the detection light.

5. The display panel of claim 4, wherein the illumination source is configured to provide totally internally reflected ultra-violet (UV) edge lighting of the touch pane.

6. The display panel of claim 1, wherein the display generation module comprises a liquid crystal display (LCD).

7. The display panel of claim 1, wherein the detection light receiver comprises at least one printed circuit board (PCB) and an array of photodetectors mounted on the at least on PCB.

8. The display panel of claim 1, wherein the detection light comprises near-infrared (NIR) light.

9. The display panel of claim 1, wherein the detection light receiver comprises at least one camera sensitive to the detection light.

10. A system for sensing an object touching a display surface, the system comprising:
    an illumination source located above the object and separate from the display surface, the illumination source configured to provide a detection light, wherein the detection light is substantially shadow-free when the object is present;
    the display surface including at least one display panel, each at least one display panel comprising:
        a touch pane configured to allow the detection light generated by the illumination source to pass through the touch pane;
        a back inner surface;
        a display generation module located between the touch pane and the back inner surface, the display generation module configured to produce a visual display at the touch pane, the display generation module further configured to allow the detection light received from the touch pane to pass through the display generation module;
        a detection light receiver situated at the back inner surface; and
    at least one processor configured to interpret a detection light data generated from the detection light received at the detection light receiver;
    the system configured to detect touches of the object to the touch pane of the at least one display panel.

11. The system of claim 10, wherein each at least one display panel further comprises a detection light filter positioned between the display generation module and the back inner surface, the detection light filter configured to pass the detection light received from the touch pane and passed through the display generation module, the detection light filter further configured to reject a light produced by the display generation module.

12. The system of claim 10, wherein the illumination source emits near-infrared (NIR) light.

13. The system of claim 12, wherein the illumination source emits NIR light which is broadly and diffusely distributed so as to only allow shadows when objects are in substantial contact with the touch pane of the at least one display panel.

14. The system of claim 10, wherein the display surface is implemented as one of a multi-touch wall and a multi-touch floor.

15. The system of claim 10, wherein the display generation module comprises a liquid crystal display (LCD).

16. The system of claim 10, wherein the detection light receiver of each at least one display panel comprises at least one printed circuit board (PCB) and an array of photodetectors mounted on the at least on PCB.

17. The system of claim 10, wherein the detection light comprises near-infrared (NIR) light.

18. The system of claim 10, wherein the touch pane is transparent, and is edge illuminated with detection light captured within the at least one display panel by total internal reflection, and where the detection light is released at a touch point by the index match of a finger or other index object, and where the detection light escaping at the touch point is detected by the system.

19. The system of claim 10, further comprising an ultra-violet (UV) fluorescent elastomeric layer situated so as to overlay and contact an outer surface of the touch pane, the illumination source further configured to provide both UV and NIR light, and where touches to the touch pane result in both high-resolution UV visible images and NIR touch signals for the detection light receiver.

20. A method for sensing an object touching a display panel using a detection light generated by a light source located above the object and separate from the display panel, the display panel having a touch pane, a back inner surface, a display generation module between the touch pane and the back inner surface, and a detection light receiver situated at the back inner surface, the method comprising:
    receiving, at the touch pane, the detection light generated by the light source located above the object and separate from the display panel, wherein the detection light is substantially shadow-free when the object is present;
    allowing the detection light received at the touch pane to pass through to the display generation module, the detection light passing through the display generation module, towards the back inner surface;
    receiving the detection light passed through the display generation module at the detection light receiver situated at the back inner surface;
    sensing touches of the object to the touch pane according to the detection light received at the detection light receiver.

21. The method of claim 20, further comprising filtering a light passed through the touch pane and the display generation module, the filtering resulting in passage of the detection light towards the back inner surface, the filtering further resulting in rejection of a light produced by the display generation module.

22. The method of claim 20, further comprising generating a detection light data from the detection light received at the detection light receiver.

23. The method of claim 20, wherein generating the detection light data comprises synchronizing row and column drive signals scanned from the detection light receiver, with a video standard, to produce a video output as the detection light data.

24. The method of claim 20, further comprising processing a detection light data generated from the detection light received at the detection light receiver to detect the touches to the touch pane of the display panel.

25. The method of claim 20, further comprising utilizing the display generation module to produce a visual display at the touch pane of the display panel.

26. The method of claim 20, further comprising emitting an ultra-violet (UV) fluorescence at the touch pane in response to touching of the touch pane of the display panel.

27. The method of claim 20, wherein directing the detection light received at the touch pane through the display generation module comprises passing the detection light received at a front outer surface of the touch pane to the display generation module.

28. The method of claim 20, wherein directing the detection light received at the touch pane through the display generation module comprises reflecting the detection light received from a detection light illumination source contained within the display panel to the display generation module.

\* \* \* \* \*

UNITED STATES PATENT AND TRADEMARK OFFICE
CERTIFICATE OF CORRECTION

PATENT NO. : 9,524,047 B2
APPLICATION NO. : 12/322038
DATED : December 20, 2016
INVENTOR(S) : Lanny S. Smoot It is certified that error appears in the above-identified patent and that said Letters Patent is hereby corrected as shown below:

In the Claims

Column 12, Line 36, "shadow-free when the object is present;" should be --shadow-free;--
Column 13, Line 18, "shadow-free when the object is present;" should be --shadow-free;--
Column 14, Line 23, "shadow-free when the object is present;" should be --shadow-free;--

Signed and Sealed this
Twenty-second Day of May, 2018

Andrei Iancu
*Director of the United States Patent and Trademark Office*